United States Patent

[11] 3,631,321

[72] Inventor David L. Eisenstadt
    Warrensville Heights, Ohio
[21] Appl. No. 23,632
[22] Filed Mar. 30, 1970
[45] Patented Dec. 28, 1971
[73] Assignee Lear Siegler, Inc.
    Santa Monica, Calif.

[54] STATIC GROUND FAULT CIRCUIT
    7 Claims, 4 Drawing Figs.
[52] U.S. Cl.................................................. 317/13 R,
    317/18 R, 317/27 R, 317/33 SC
[51] Int. Cl..................................................... H02h 7/06
[50] Field of Search............................................ 317/27 R,
    14 D, 13 R, 18 R, 33 SC

[56] References Cited
    UNITED STATES PATENTS
    2,825,006 2/1958 Leppla .......................... 317/27 X
    2,974,257 3/1961 Flugstad....................... 317/27 X Primary Examiner—James D. Trammell
Attorney—Bosworth, Sessions, Herrstrom & Cain ABSTRACT: A circuit for protecting a DC power source such as a DC generator or a battery from a ground fault condition between two points in a current path connected to the source. One point may be a terminal of the source and the other a load bus to which the source is connected by a feeder conductor. Sensing means such as a current transformer at each of the points senses changes in current flowing and provides a signal proportional thereto. The two sensing means are connected with their outputs in series opposition and produce a signal indicative of an unbalanced current change. This signal is employed to cause the source to be disconnected from the load bus and/or from the feeder conductor. When the DC source is a generator, the unbalance signal is used to interrupt the generator field excitation. During generator buildup, a ground fault is detected by an increased voltage drop across the interpole winding. This voltage drop is utilized to cause the generator to be disconnected from the load bus and its field deenergized. When the power source is a battery, a capacitor charged thereby energizes the actuating circuit temporarily when the battery voltage is lowered excessively by a ground fault.

INVENTOR.
DAVID L. EISENSTADT
BY Bosworth, Sessions,
Hornston & Chin.
ATTORNEYS

STATIC GROUND FAULT CIRCUIT

BACKGROUND OF THE INVENTION

This invention relates to circuits for providing ground fault protection for a source of DC power such as a DC generator or a battery which supplies current to a load bus through a relatively long feeder conductor and a main contactor. More particularly, the invention relates to such circuits for detecting a ground fault condition between two points in a current path connected to the power source and for preventing the power source from supply current to the ground fault. Another aspect of the invention relates to the detection of a ground fault both during and after generator buildup in systems employing a DC generator as a power source.

Conventional circuits for providing ground fault protection employ a pair of current transformers, one for sensing changes in the amount of current at a first point in the positive feeder cable which may be immediately before the main contactor, and the other for sensing changes in the amount of current at a second point which may be the negative or ground-connected terminal of the power source. The current transformers are connected in series opposition and to the coil of a balanced beam relay so that an unbalance in the currents sensed by the transformers actuates the relay. Closing of the relay contacts completes a circuit which opens the main contactor and, in the case of a DC generator, trips the field relay to cut off excitation to the generator filed.

Because the current transformers are lower-power devices, the balanced beam relay is necessarily and delicately tuned, precisely balanced mechanical device that must be carefully protected from sudden jolts or vibration Occasionally a severe shock causes closing of its contacts, resulting in deenergization of the generator field when no ground fault has actually occurred.

The balanced beam type ground fault relay can also be actuated by an appropriate signal when a ground fault condition is sensed during generator buildup This signal is conventionally provided by current flow from ground through a contact on the main line contactor in the open position to the negative terminal of the generator. This terminal is also connected to the interpole windings and is driven negative by the voltage drop across the interpole windings occurring when current flows from the generator. The protection thus afforded during buildup by conventional circuits depends upon the operation of the delicate, balanced beam relay and suffers from the shock and vibration problems inherent in its operation.

SUMMARY OF THE INVENTION

A general object of this invention is to provide a ground fault protection circuit that overcomes the problems encountered with conventional ground fault protection circuits.

A more particular object is to provide a reliable ground fault protection circuit that employs rugged, dependable and preferably solid-state components for responding to appropriate signals from a sensing device or devices to prevent the power source from supplying current to the ground fault.

Another object is to provide a ground fault protection circuit that may be employed to provide protection to a DC generator, a battery, or a similar current-supplying device.

Still another object is to provide a ground fault protection circuit for a DC generator that provides reliable protection for the generator, both during and after generator buildup.

A preferred embodiment of this invention for protecting a source of DC power during operation after startup from a ground fault between two points in a current path connected to the source comprises a first current transformer for sensing a change in the amount of current at a first point in the current path and a second current transformer for sensing a change in the amount of current at a second point in the current path. The current transformers are connected in series opposition to produce a resultant signal indicative of the difference in the current sensed by the first and second current transformers. Rectifier means is coupled to the current transformers for rectifying the resultant signal and a controlled rectifier is coupled to the rectifier means to be rendered conductive by the rectified resultant signal. Switch means responsive to the conductive state of the controlled rectifier actuates the relay means to prevent the source from supplying current to the ground fault.

When the source of DC power is a generator, this embodiment may also include aspects designed to afford ground fault protection during generator buildup. These features comprise means for sensing the voltage drop across the interpole windings of the generator resulting from current flow to ground and for deriving an appropriate signal to trigger the controlled rectifier mentioned above.

DESCRIPTION OF THE PREFERRED EMBODIMENTS

Figure 1:
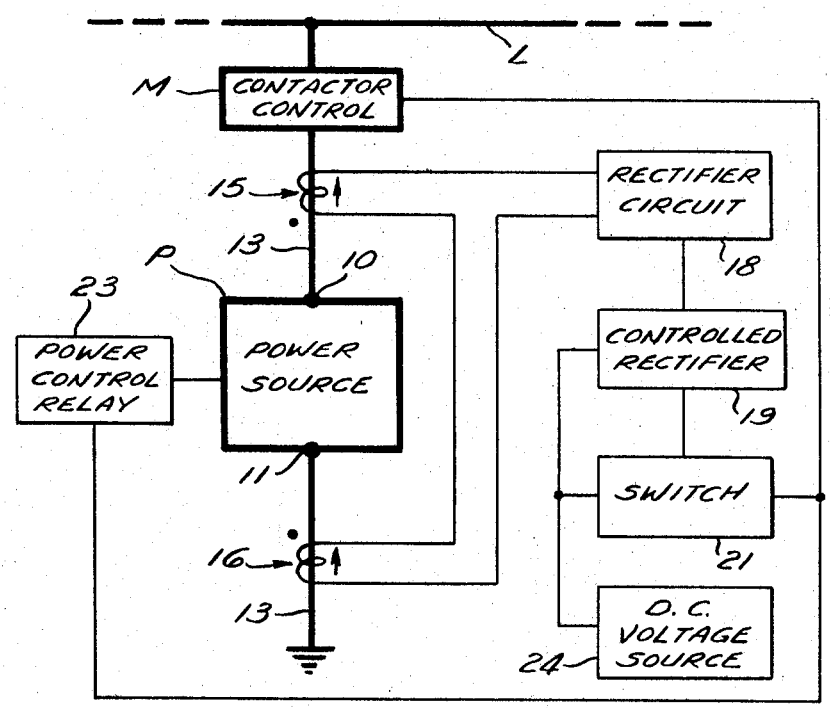
FIG. 1 is a combined block and schematic diagram of a preferred embodiment of this invention.

A preferred embodiment of the invention is shown in FIG. 1 for protecting a DC power source P which has an output terminal 10 and a reference terminal 11. Power is supplied from output terminal 10 through the output portion of feeder conductor 13 and a main contactor M to a load bus L and returns to power source P through the return portion of feeder conductor 13 and reference terminal 11 which is grounded as shown. In a typical power system such as, for example, an aircraft DC generator system, power source P may be located physically a considerable distance from the point where it is connected by main contactor M to load bus L so that a considerable length of heavy cable is required for the feeder conductor. The feeder conductor may develop a short circuit and/or become grounded at any point along its length due to any one of a number of causes.

To monitor feeder conductor 13 for such local faults, current transformers 15 and 16 are inductively associated with the power source current path in the manner shown and at widely spaced locations from each other to provide a protected zone between them. The desired interconnection of the transformers is shown by the dot symbol convention applied to the secondary or sensing windings of the transformers together with the arrows indicating direction of current flow in the primary, i.e. feeder conductor 13.

Current transformer 16 is preferably placed to sense any change in the current in the return path to terminal 11 of power source P, while current transformer 15 is preferably placed as near as possible to main contactor M to sense any change in the current at that point. Current transformers 15 and 16 may, of course, be positioned at any two points in a current path connected to power source P to monitor any desired portion of the current path.

If no fault is present in the protected zone, both current transformers 15 and 16 sense substantially equal changes in current. If, however, some local fault develops in the zone protected by the current transformers, a current change occurs in one portion of the line which is not balanced by a corresponding current change in the other portion of the line. The secondary windings of current transformers 15 and 16 are connected in series opposition so that the unbalanced current condition sensed by the current transformers is translated into a difference signal. This difference signal may be of either polarity, depending upon the relative changes sensed by the transformers. The difference signal is applied to a rectifier circuit 18 where it is rectified to provide a signal of the proper polarity to fire controlled rectifier 19. Controlled rectifier 19 is preferably highly sensitive to small currents such as the difference in current produced by current transformers 15 and 16.

Conduction of controlled rectifier 19 actuates a switch 21 which, in turn, controls the energization of power control relay 23. Control relay 23 permits or prevents power source P from supplying current to the feeder conductor 13. Operation of switch 21 also causes main contactor M to open, disconnecting power source P from the load bus L. Power may be supplied to controlled rectifier 19 and switch 21 by a separate DC source 24, or by power source P.

Figure 2:
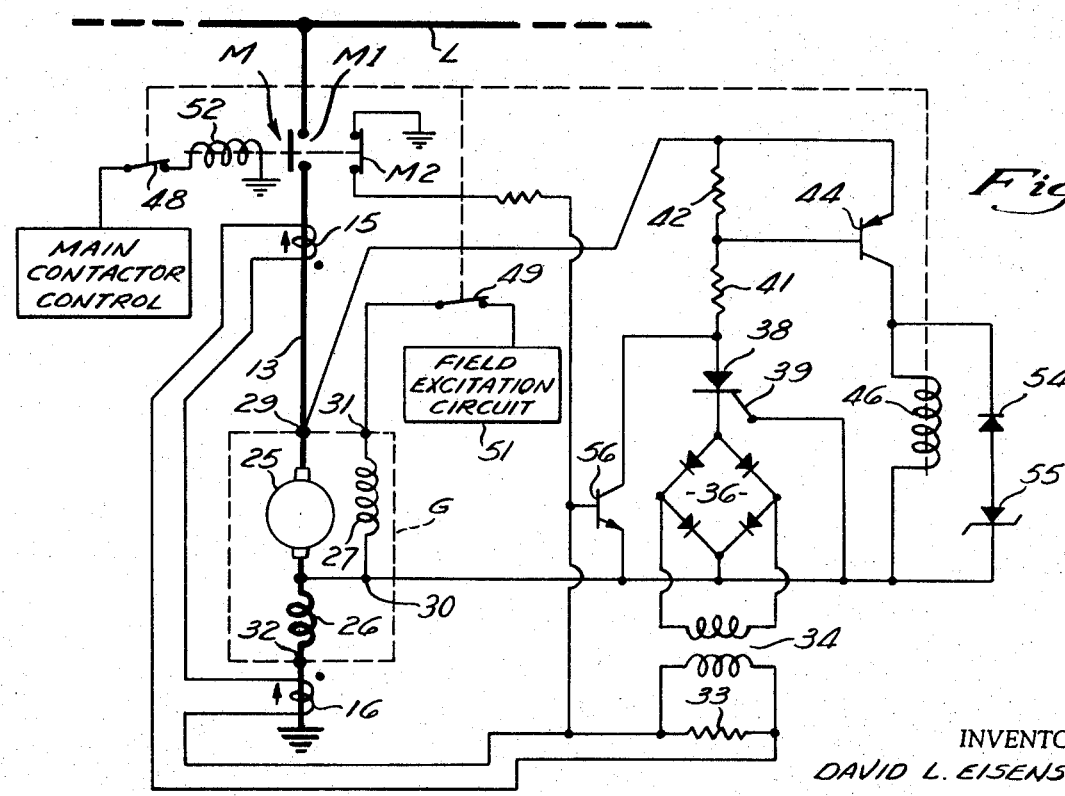
FIG. 2 is a schematic diagram of a form of this invention preferred for protecting a DC generator.

In FIG. 2, one form of the invention is shown protecting a power source comprising a conventional DC generator G having an armature 25, an interpole winding 26, and a shunt field winding 27, as well as an output terminal 29, a reference terminal 30, a shunt field terminal 31, and a neutral terminal 32, the latter being connected to ground through the return portion of feeder conductor 13. Terminal 29 is connected by means of the output portion of feeder conductor 13 to one of a pair of contacts M1 of main contactor M. The other side of the pair is connected to load bus L.

Current transformer 15 is inductively associated with the output portion of feeder conductor 13 as near as possible to contacts M1 to sense current changes at that point, while current transformer 16 is connected to sense changes in the current returning through feeder conductor 13 to neutral terminal 32. The current transformers are connected in series opposition and across a resistor 33 which is connected to the primary of a voltage transformer 34.

The secondary of voltage transformer 34 is connected to the input terminals of a bridge rectifier 36 arranged to provide output signal of a single polarity, e.g. negative as shown in FIG. 2. One output terminal of rectifier 36 is connected to reference terminal 30 of generator G and the other output terminal is connected to the cathode of a controlled rectifier 38. Gate lead 39 of controlled rectifier 38 is also connected to generator reference terminal 30. Controlled rectifier 38 conducts when the applied potential at the cathode is more negative by a predetermined amount than the potential at gate lead 39. Bridge rectifier 36 tends to maintain the cathode of controlled rectifier 38 more positive than gate 39 in the absence of a signal from voltage transformer 34 and thereby to render the controlled rectifier relatively noise immune. The anode of controlled rectifier 38 is connected through the series combination of resistors 41 and 42 to output terminal 29 of generator G.

The junction of resistors 41 and 42 is connected to the base of a transistor 44. The emitter of transistor 44 is connected to output terminal 29 of generator G, and the collector is connected to coil 46 of a field control relay having contacts 48 and 49. Contact 49 connects shunt field 27 of generator G to a field excitation circuit 51. Contact 48 connects actuating coil 52 of main contactor M to a main contactor control circuit 53 for controlling the actuation of the main contactor. Both contacts 48 and 49 are opened when coil 46 is energized.

A diode 54 and a zener diode 55 are connected as shown across coil 46 to protect transistor 44 from the effects of the collapsing magnetic fields in relay coil 46 when the coil is deenergized. The breakdown voltages of zener diode 55 are chosen to limit the magnitude of the voltage produced by the collapsing magnetic field, while diode 54 prevents coil 46 from being shunted by forward conduction of zener diode 55.

Field excitation circuit 51 may be of any known type and may comprise merely a power source and a variable resistor to vary the amount of current to the generator field. Main contactor control circuit 53 may likewise be of any known type and may comprise merely a power source and a relay that connects the generator to the load bus whenever the generator is developing sufficient output voltage and disconnects the generator when the output voltage falls below a predetermined level.

In the event of a ground fault during generator buildup, a large amount of current will flow through interpole winding 26, causing reference terminal 30 of the generator to become more negative with respect to ground. If terminal 30 becomes sufficiently negative, transistor 56 will conduct, causing current flow through resistors 41 and 42 which, in turn, causes transistor 44 to conduct current to coil 46. Energizing coil 46 opens contacts 49, disconnecting shunt field 27 from field excitation control circuit 51. Voltage transformer 34 provides isolation for bridge rectifier 36 during generator buildup to prevent ground noise through contacts M2 from erroneously triggering controlled rectifier 38.

After buildup of generator G, main contactor M is actuated, closing contacts M1 to connect the generator to the load bus L and opening contacts M2 to disenable transistor 56.

After buildup of generator G is complete and main contactor M is actuated, current transformers 15 and 16 monitor the currents at the respective points of the circuit as discussed above. In the event of a ground fault, an unbalanced signal is produced across resistor 33 and is coupled across transformer 34 and through bridge rectifier 36 to become a negative signal at the cathode of controlled rectifier 38. Controlled rectifier 38 is rendered conductive by the negative signal, turning on transistor 44 which energizes coil 46 and opens contacts 48 and 49. Opening of contacts 48 and 49 disconnects feeder conductor 13 from the load bus and interrupts excitation to shunt field winding 27. With its shunt field current reduced to zero, generator G can no longer supply armature current to the detected ground fault.

Figure 3:
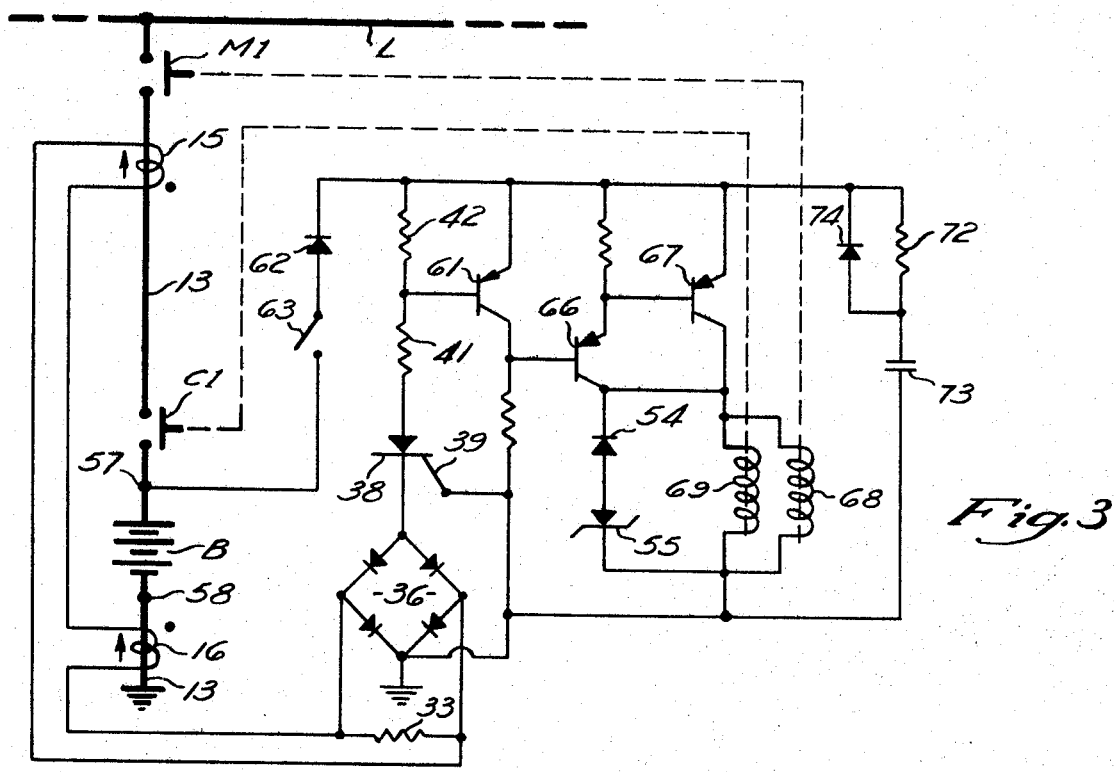
FIG. 3 is a schematic diagram of a form of this invention preferred for protecting a battery or similar power source.

Referring now to FIG. 3, there is shown a slightly different form of ground fault protection circuit for protecting a battery B which has an output terminal 57 and a grounded terminal 58. Elements in FIG. 3 having counterparts in the circuit of FIG. 1 are identified by the same reference numerals. Battery B supplies current to load bus L through contacts C1 of a local contactor C, the output portion of feeder conductor 13, and contact M1 of main contactor M. Current transformer 15 is connected to sense a change in current in feeder conductor 13 immediately before contacts M1, while current transformer 16 is connected to sense the current returning to terminal 58 of battery B.

The current transformers are connected in series opposition across resistor 33 to develop a difference signal which is rectified by bridge rectifier 36 to a negative-going signal at the cathode of controlled rectifier 38. The anode of controlled rectifier 38 is connected through resistor 41 to the base of transistor 61 and then through resistor 42, diode 62, and switch 63 to output terminal 57 of battery B. The collector of transistor 61 is connected to the base of transistor 66, the emitter of which is connected to the base of transistor 67. The collectors of transistors 66 and 67 are connected together and to coil 68 of main contactor M and coil 69 of local contactor C, the two coils being connected in parallel. With switch 63 closed and controlled rectifier 38 nonconductive, transistor 61 is nonconducting and transistors 66 and 67 conduct current to coils 68 and 69. A zener diode 55 and a conventional diode 54 are connected across coils 68 and 69 to protect transistors 61, 66, and 67 as described above in reference to FIG. 2.

A circuit comprising resistor 72, capacitor 73, and diode 74 is connected in the circuit to act as an auxiliary "power supply" for the circuit in a manner to be described below.

Operation of the circuit of FIG. 3 is substantially the same as that of FIG. 2, described above. During normal operation, coils 68 and 69 are energized and battery B is connected through local contactor C and main contactor M to load bus L. A local ground fault sensed by current transformers 15 and 16 produces a signal across resistor 33 which is rectified by bridge rectifier 36 and turns on controlled rectifier 38. Conduction by controlled rectifier 38 turn on transistor 61 which, in turn, causes transistors 66 and 67 to interrupt current to main contactor coil 68 and local contactor coil 69. Contact M1 of main contactor M and contact C1 of local contactor C are opened, isolating battery B and load bus L from the ground fault and preventing the battery from supplying said current thereto.

In the event of a severe local ground fault, the terminal voltage of battery B may fall to such a level that sufficient current can no longer be supplied to operate the ground fault circuit and disconnect the battery from the fault. The circuit comprising resistor 72, capacitor 73 is charged to the and diode 74 serves as an auxiliary power source to supply sufficient operating current to the ground fault circuit in that case.

In normal operation, capacitor 73 is charged to the potential of battery B through resistor 72. In the event of a ground fault that drastically lowers the terminal voltage of battery B, capacitor 73 supplies operating current to controlled rectifier 38 and transistor 61 to allow them to conduct and cut off transistors 66 and 67. Coils 68 and 69 are thus deenergized and battery B is disconnected from the ground fault. Diode 62 prevents capacitor 73 from discharging into the battery and preferably has a lower recovery time from forward conduction to its blocking stage so that current from capacitor 73 is immediately blocked from flowing to battery B.

Figure 4:
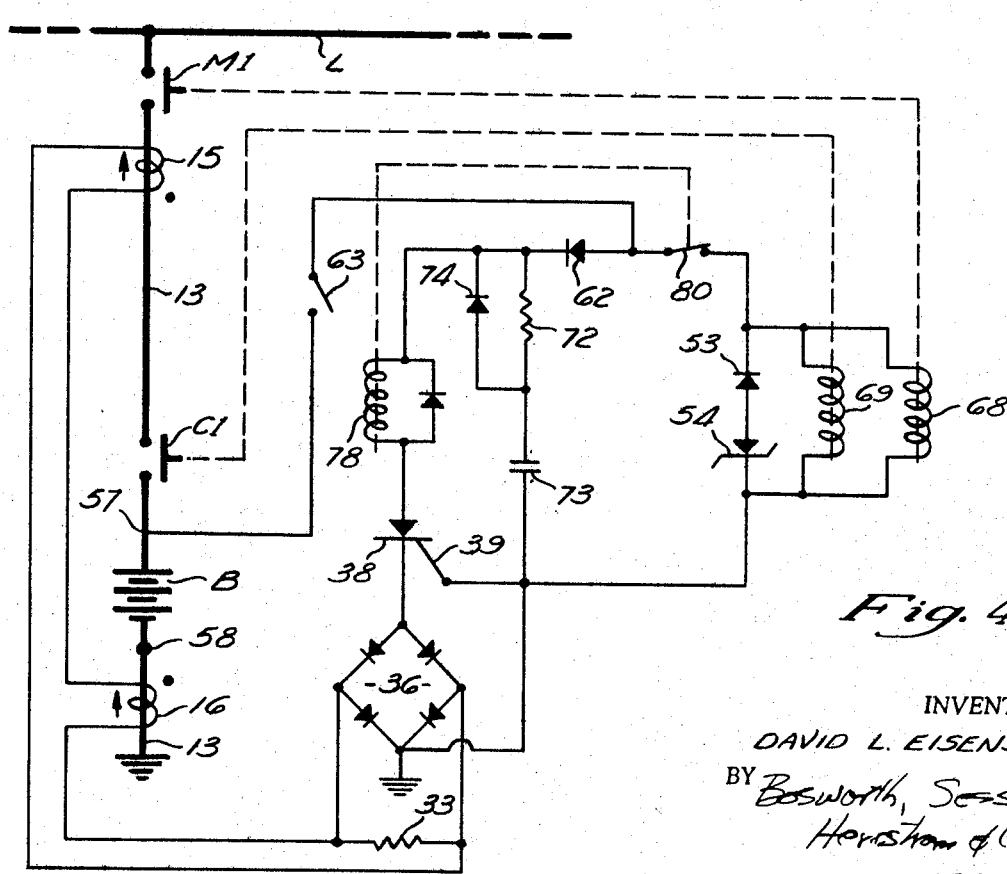
FIG. 4 is a schematic diagram of an alternate circuit for protecting a battery or similar power source.

FIG. 4 illustrates an alternate circuit to that of FIG. 3 in which a relay is substituted for transistors 61, 66, and 67. Again, elements in FIG. 4 having counterparts in FIG. 1 are identified by the same reference numerals. The coil 78 of the relay is serially connected to controlled rectifier 38, while a normally closed contact 80 is serially connected to coils 68 and 69 of the main and local contactors, respectively. In normal operation, coil 78 is not energized and coils 68 and 69 receive current through contact 80. If a ground fault is detected, controlled rectifier 38 is rendered conductive. Coil 78 is energized and contact 80 interrupts current to coils 68 and 69, causing battery B to be disconnected from load bus L and from the ground fault.

Capacitor 73 again supplies current to controlled rectifier 38 as described above if the terminal voltage of battery B is lowered excessively because of the ground fault.

The static ground fault protection circuit of this invention may be employed in systems using a single generator or battery or in systems where several generators or batteries are connected in parallel to supply a common load bus. In the latter case, each local generator or battery is provided with its own individual ground fault protection circuit.

Those skilled in the art will appreciate that various other changes and modifications can be made in the preferred form of apparatus described herein without departing from the spirit and scope of the invention.

I claim:

1. In a power system in which a source of DC power having a output terminal and a grounded terminal supplies current to a load bus through a feeder conductor, a circuit for detecting a ground fault condition between two points in the current path of said source and for preventing said source from supplying current to said ground fault, said circuit comprising
a first current transformer for sensing a change in current at a first point in said current path,
a second current transformer for sensing a change in the current at a second point in said path, said current transformers being connected in series opposition to produce a resultant signal indicative of the difference in the current changes sensed thereby,
rectifier means coupled to said current transformers for rectifying said resultant signal,
a controlled rectifier having two conductive states and coupled to said rectifier means and responsive to said rectified resultant signal to assume one of its conductive states,
relay means for permitting and preventing said source from supplying current to said ground fault,
switch means responsive to the conductive state of said controlled rectifier provided by said resultant signal and for actuating said relay means to cause said relay means to prevent said source from supplying current to said ground fault,
a capacitor connected across said controlled rectifier for storing energy from said power source and for energizing said controlled rectifier when the potential of said power source falls below the potential of said capacitor, and
a diode between said source and said capacitor for preventing the flow of current from said capacitor to said power source.

2. The circuit of claim 1 wherein said first current transformer is placed to sense a change in current immediately before the point where said conductor is connected to said load bus, and said second current transformer is placed to sense a change in current returning to said grounded terminal.

3. The circuit of claim 1 further comprising a main contactor for connecting said conductor to and disconnecting it from said load bus, said contactor being controlled in conjunction with said relay means by said switch means to disconnect said conductor from said load bus and wherein said first current transformer is placed to sense a change in the current immediately before said main contactor.

4. The circuit of claim 1 wherein said power source is a battery, said relay means comprises a local contactor having a coil and having a contact between the output terminal of said battery and said conductor and said switch means comprises a first transistor rendered conductive by conduction of said controlled rectifier and a normally conductive transistor switch connected to said coil rendered nonconductive by conduction of said first transistor whereby said contact is opened upon conduction by said controlled rectifier.

5. The circuit of claim 1 wherein said power source is a battery, said relay means comprises a local contactor having a coil and having a contact between the output terminal of said battery and said conductor, and said switch means comprises a relay having a coil energized by conduction of said controlled rectifier and having a normally closed contact connected to said coil of said local contactor whereby said contact of said local contactor is opened upon conduction by said controlled rectifier.

6. In a power system in which a DC generator supplies current to a load bus through a feeder conductor, said generator having an armature connected between an output terminal and a reference terminal, a shunt field winding connected between a field terminal and said reference terminal, an interpole winding connected between a grounded terminal and said reference terminal, and means for supplying excitation to said shunt field winding, a circuit for detecting a ground fault condition between two points in the current path of said generator and for preventing said DC generator from supplying current to said fault, said circuit comprising
a first current transformer for sensing a change in current at a first point in said path,
a second current transformer for sensing a change in current at a second point in said path, said current transformers being connected in series opposition to produce a resultant signal indicative of the difference in the current changes sensed thereby,
rectifier means coupled to said current transformers for rectifying said resultant signal,
a controlled rectifier having two conductive states and coupled to said rectifier means and responsive to said rectified resultant signal to assume one of its conductive states,
first static switch means rendered conductive in response to the conductive state of said controlled rectifier provided by said resultant signal,
a field control relay actuated by conduction of said first static switch means, said field control relay having a contact between said field excitation means and said shunt field terminal for interrupting excitation to said field upon actuation of said field control relay, whereby said generator is prevented from supplying current to said conductor, and
means for detecting a ground fault condition only during generator buildup comprising
contact means providing a path to ground only during generator buildup, and second static switch means having its output terminals connected in circuit with said first static switch means, said first static switch means being rendered conductive in response to conduction by said second static switch means, said second static switch means having one input terminal connected to said reference terminal of said generator and the other input terminal connected to said contact means, said second static switch means being rendered conductive by current flowing in said generator causing a voltage drop of predetermined magnitude between ground and said reference terminal.

7. In a power system in which a source of DC power having an output terminal and a grounded terminal supplies current to a load bus through a feeder conductor, a circuit for detecting a ground fault condition between two points in the current path of said source and for preventing said source from supplying current to said ground fault, said circuit comprising a first current transformer for sensing a change in current at a first point in said current path, a second current transformer for sensing a change in the current at a second point in said path, said current transformers being connected in series opposition to produce a resultant signal indicative of the difference in the current changes sensed thereby, a bridge rectifier coupled to said current transformers for rectifying said resultant signal, a controlled rectifier having a gate terminal and a cathode terminal and having said bridge rectifier connected between said gate and cathode terminals, said bridge rectifier tending to reverse bias said controlled rectifier in the absence of a resultant signal and steering said resultant signal to cause it to render said controlled rectifier conductive, relay means for permitting and preventing said source from supplying current to said ground fault, and switch means responsive to the conductive state of said controlled rectifier for actuating said relay means to cause said relay means to relay said source from supplying current to said ground fault.

\* \* \* \* \*

UNITED STATES PATENT OFFICE
CERTIFICATE OF CORRECTION

Patent No. 3,631,321    Dated December 28, 1971

Inventor(s) David L. Eisenstadt

It is certified that error appears in the above-identified patent and that said Letters Patent are hereby corrected as shown below:

Column 1, line 28, change "filed" to --field-- line 29, change "lower-power" to --low power-- line 30, change "and" to --a--

Column 3, line 32, change "signal" to --signals--

Column 4, line 74, cancel "said"

Column 5, line 5, insert a comma after "73" and cancel "is charged to the"

line 16, change "lower" to --low-- line 17, change "stage" to --state-- line 48, change "a" (first occurrence) to --an-- (second occurrence)

Column 8, line 19, change "relay"/to --prevent--

Signed and sealed this 6th day of June 1972.

(SEAL)
Attest:

EDWARD M. FLETCHER, JR.
Attesting Officer

ROBERT GOTTSCHALK
Commissioner of Patents